(12) United States Patent
Heber

(10) Patent No.: US 8,498,990 B2
(45) Date of Patent: Jul. 30, 2013

(54) SYSTEM AND METHOD FOR ANALYZING, GENERATING SUGGESTIONS FOR, AND IMPROVING WEBSITES

(76) Inventor: Yosi Heber, Oak Park, MI (US)

( * ) Notice: Subject to any disclaimer, the term of this patent is extended or adjusted under 35 U.S.C. 154(b) by 187 days.

(21) Appl. No.: 11/404,718

(22) Filed: Apr. 14, 2006

(65) Prior Publication Data

US 2006/0253345 A1 Nov. 9, 2006

Related U.S. Application Data

(60) Provisional application No. 60/671,969, filed on Apr. 14, 2005.

(51) Int. Cl.
*G06F 17/30* (2006.01)

(52) U.S. Cl.
USPC .......................................................... 707/748

(58) Field of Classification Search
None
See application file for complete search history.

(56) References Cited

U.S. PATENT DOCUMENTS

| | | | | |
|---|---|---|---|---|
| 6,381,635 B1* | 4/2002 | Hoyer et al. | ................... | 709/207 |
| 7,269,643 B2* | 9/2007 | Spaid | ............................. | 709/223 |
| 7,305,622 B2* | 12/2007 | Cohen et al. | ................... | 715/736 |
| 2002/0073125 A1* | 6/2002 | Bier | ............................... | 707/530 |
| 2002/0152237 A1* | 10/2002 | Cohen et al. | ................... | 707/513 |
| 2002/0156799 A1* | 10/2002 | Markel et al. | .................. | 707/202 |
| 2003/0172349 A1* | 9/2003 | Katayama et al. | ............ | 715/513 |
| 2005/0262240 A1* | 11/2005 | Drees et al. | .................... | 709/224 |

* cited by examiner

*Primary Examiner* — Dinku Gebresenbet
(74) *Attorney, Agent, or Firm* — Kohn & Associates, PLLC

(57) ABSTRACT

A content and data analysis method for evaluating and improving a website, by accessing the website to be analyzed, analyzing the content and data associated with the website, scoring the website based on a multitude of criteria, generating suggestions for improving the website, and implementing changes and improvements to the website. An electronic content and data analysis system and software program including an accessing mechanism for viewing the website to be analyzed, an analyzing mechanism for reviewing the content and data associated with the website, a scoring mechanism for attributing scores to the website based on a multitude of criteria; a generating mechanism for providing suggestions for improving a website; and an editing mechanism for implementing changes and improvements to a website is disclosed.

21 Claims, 3 Drawing Sheets

SYSTEM AND METHOD FOR ANALYZING, GENERATING SUGGESTIONS FOR, AND IMPROVING WEBSITES

CROSS REFERENCE TO RELATED APPLICATIONS

This application claims the benefit of priority under 35 U.S.C. §119(e) of U.S. Provisional Patent Application Ser. No. 60/671,969, filed Apr. 14, 2005, which is incorporated herein by reference.

BACKGROUND OF THE INVENTION

1. Field of the Invention

Generally, the present invention relates to an analytical method and system. More specifically, the present invention relates to a method and system for evaluating and measuring a website's overall quality and ability to generate revenue, comparing the website with other websites, reporting the system's results to the user, suggesting modifications to be made to the website, and implementing improvements in the website.

2. Description of Related Art

In the late 1990's, the Internet generated a great deal of enthusiasm and businesses overrated its ability to change the world. In 2001, the Internet "bubble" burst, the stock market crashed, and the Internet's utility as a business tool was called into question.

By 2004, with the success of Google and its IPO, companies began to better appreciate the power of the Internet, and increasingly began to use the web as an advertising medium. Over the last few years, the Internet has also played an increasing significant role in the lives of average consumers. For example, the average person spends a few hours of each workday tending to e-mails, and over 50% of all households with Internet connections have purchased products online over the past year.

Although the Internet currently accounts for only 4.3% of all media spending (TV and magazines account for most of the rest), the web occupies 14% of all consumers' media exposure time, indicating a huge opportunity for online marketers to fill, in terms of web related advertising.

Nowadays, almost all companies have websites. Most company websites provide extensive product "information" and often contain brand building and customer service features (e.g., how to contact us, free recipes, etc.). But, with the exception of a few websites who effectively market themselves via the web (e.g., Amazon, EBay, travel sites like Orbitz), only a very small percentage of websites actually generate substantive new revenues for their owners, and after taking the cost of web operations into account, even fewer websites are actually profitable. In fact, most websites actually lose money.

Most companies have invested significant resources to create, update and maintain their websites. Yet, instead of driving incremental (new) revenue to the business and delivering a measurable "return on their investment", websites have been reduced to a new "cost of doing business" for many companies.

Since the return on investment for websites is often negative, and companies cannot pinpoint the reasons for this profit loss, they are generally reluctant to further invest in improving their websites, adding more features, and increasing advertising. Furthermore, this trend is perpetuated by the absence of basic analytical tools for measuring the quality and effectiveness of a company's website and for identifying specific areas in need of modification or improvement. It would therefore be useful to develop a methodology for analyzing the effectiveness of a website from a revenue generating perspective, and for identifying and implementing changes to areas in need of improvement.

The basic question therefore becomes: How can companies learn enough to help increase their website's profitability? If companies could clearly dissect all of the business elements of their websites, and measure the potency and effectiveness of each one of those drivers (especially those which drive new and incremental business), the company could then take steps to optimize those specific elements to create new revenue streams and increase the website's profitability.

There are companies such as ForSee Research and Keynote who speak to large groups of consumers about their experiences with a website. They then report on the level of overall "customer satisfaction" with that website as well as likes and dislikes. While these companies are able to analyze certain website features, each of these firms generally only measure 10-20% of the elements that make a corporate or branded website effective (i.e., customer satisfaction), comprehensive, and fully profitable. In other words, there are no analytic tools that measure a website's OVERALL ability to generate revenue. Additionally, these services are often only available to large companies who can invest in such consultants and surveys. Smaller, emerging companies, who often turn to the Internet as a cost effective method for doing business, generally cannot afford these often-expensive consultants.

Furthermore, some companies use a website's technical performance as a benchmark for effectiveness. They report the speed with which a website loads across the world (e.g., Keynote) or IT response time (e.g., Cymphony). Other web analytics companies (e.g., Comscore, Nielsen) measure a website's audience for advertising purposes, i.e., how many visitors, who they are, and consumer demographics. Additionally, some companies (e.g., WebTrends) also measure user movements on a particular website, i.e. number of visitors, number of pages seen, and how long they visited each page. Again, while this information is somewhat helpful in evaluating a website's effectiveness, it paints an incomplete picture of what drives the website's overall revenue.

A number of web analytic companies also offer some level of quality measurement, but each one of these measures only capture one or two of the key drivers of revenue and do not paint a comprehensive picture of a website's profitability, especially in light of an "industry standard" that may exist across industry websites.

For example, "quality of user experience" may be a useful tool to measure the general effectiveness of the website itself as regards the user, but this measure falls short if it ignores other critical drivers of revenue. Thus, even if 100,000 users have a high quality "user experience", that positive experience may be generating some revenue, but how well is the website set up to attract the other 5 million potential users it is not reaching? The present users may have a "good experience", but what if most of them log off before they actually make a purchase? The 100,000 may have a "great experience" and even make a purchase, but what if the website never asks for e-mail addresses? If the company does not secure the customer e-mail addresses, the company cannot develop long-term relationships with these customer users and cannot attempt to sell them products a second time.

Finally, many of the existing web analytics tools produce complex, and often esoteric data sets and results that can be difficult for the typical corporate executive to understand. There is a need for a tool that can also simplify the web analytics results, and present them in more "real world" terms, so that company executives (who ultimately make decisions regarding budgeting for their companies' website) can better understand how to invest their resources and efforts.

In summary, while there are many web analytic tools and services available, there exists no simple (single source solution) universal analytical scoring tool that allows companies to get a topline, easy to understand score of a website's OVERALL ability and capacity to generate revenue. Current solutions also do not provide specific separate scores that identify which of the many drivers of e-commerce the website excels in, and which need improvement.

SUMMARY OF THE INVENTION

According to the present invention, there is provided a content and data analysis method for evaluating and improving a website, including the steps of: accessing a website to be analyzed; analyzing the content and data associated with the website; scoring the website based on a multitude of criteria; generating suggestions for improving the website; and implementing changes and improvements to the website. The present invention also provides an electronic content and data analysis system and software program including an accessing mechanism for viewing the website to be analyzed, an analyzing mechanism for reviewing the content and data associated with the website, a scoring mechanism for attributing scores to the website based on a multitude of criteria; a generating mechanism for providing suggestions for improving the website; and an editing mechanism for implementing changes and improvements to the website.

Also described and forming another aspect of the present invention is a method of analyzing a website to generate a comparison score therefore including storing content identification data to allow content of a website to be identified, storing data defining a plurality of predetermined scoring criteria, accessing a website to be analyzed, identifying content items and attributes thereof using the content identification data, and applying the predetermined scoring criteria to the attributes to determine one or more scores for the identified content. Also provided is a method of improving a website by storing a database of example websites having predetermined scores generated in dependence on attributes of content thereof, accessing a website to be improved, obtaining one or more comparison scores for content of the accessed website, comparing the comparison score(s) with the predetermined scores of the example websites to identify content of the accessed website with a lower score, and adapting attributes of the identified content in dependence on attributes of content of the example websites having higher scores. Preferably, the method of improving the obtaining step includes a method of analyzing as disclosed above.

DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Generally, the present invention provides a method, system, and process for evaluating and measuring a website's overall quality and ability to generate revenue, suggesting changes to the website, and implementing these (and other) changes. This process can be performed and implemented manually, through human analysis and intervention (such as in context of a consultant), automatically, through a fully automated computerized evaluation system (utilizing a specialized suite of software tools), or through any combination thereof. In both manual and automatic embodiments, the process dictates that a website be evaluated based on a broad range of criteria which quantify the sites' revenue-generating capacity, suggestions be generated for improving the website's effectiveness and profitability, and the implementation of these (and other) suggestions. In the automatic embodiment, a software program is utilized to assist in evaluating and measuring a website's overall quality and ability to generate revenue, storing this information in a database, comparing the website with other websites, reporting the system's results to the user, suggesting modifications to be made to the website, and implementing improvements in the website. Such a software program can be implemented using any number of programming languages, including, but not limited to C++, Java, or any other such programming language known to those skilled in the art.

The present invention provides a method for generating a comprehensive set of scores (as well as a composite score) reflecting the health and revenue-generating capacity of a website. These scores can be generated manually (in the case of the manual embodiment of the invention, as performed by a human evaluator), automatically (in the case of the automatic embodiment of the invention, as performed by an automated software program/system), or using any combination thereof (i.e., a software program that prompts a human user to input evaluations/scores). The scores generated are "holistic" measures which gauge the overall capabilities of a website to drive revenue. The totality of these scores (reflected in a comprehensive score report as well as an overall composite score) reflect the overall health or efficiency of a website. The scores generated can be expressed based on a numerical scale (e.g., 1-10, 1-100, etc.), alphabetical scale (e.g., A-F, etc.), or any other such scoring scheme. The overall composite score is a bi-product of the exploration, analysis, and evaluation of a multitude of web oriented attributes, features, and characteristics which provide the full range of strategic drivers of website/web asset maximization. Each of these separate drivers is scored on a quality scale (e.g., 1-10, A-F, etc.). After each of these independent scores is weighed, the final, overall composite score is calculated. This final composite score reflects the websites overall health, effectiveness, and profitability.

Figure 1:
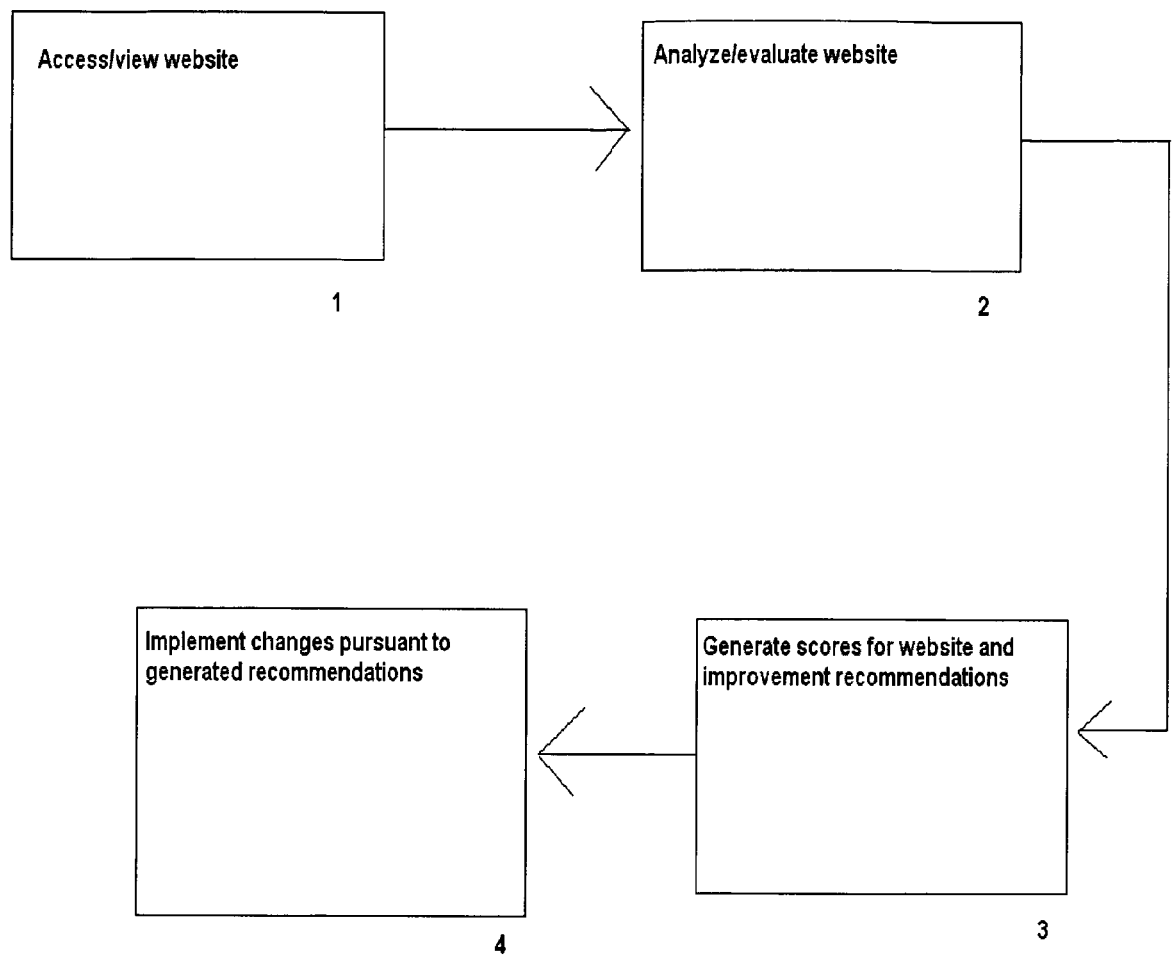
FIG. 1 represents the basic steps of the process.

FIG. 1 represents the basic steps of the process, in both manual and automatic embodiments. The present invention provides a method, system, and process for analyzing the overall health of a website as it relates to generating revenue. The method includes four steps. First, the website is accessed and viewed (1). Second, the website is analyzed using the analytical processes/tools of the present invention (2). Third, the process/analytic system generates a score and recommendations with regard to items within the website that can be improved (3). Fourth, the website can be modified pursuant to the generated recommendations (4). The technical effect of the web analytic system is being able to not only generate a score with regard to the health of the website, but also providing recommendations for improving the health of the website and allowing the user to implement these and other improvements.

More specifically, in the first step, the website to be analyzed is accessed and viewed. The website can be accessed manually by the user, or a software program/system can be configured to automatically access the desired website, or any combination thereof.

Next, the attributes, characteristics, and elements of the website are analyzed, evaluated, and scored. This process can be carried out manually, through human intervention, automatically, through the use of a software program/system, or through any combination thereof. A comprehensive list of factors is considered, depending on the type of website/industry being evaluated. Each factor is given a numerical or alphabetical "score". The scores can be added together in a number of ways. For example, scores for a type of question, such as search engine penetration can be compiled, known as the sub-topic score. Further, the sub-topic totals for a strategic topic can be compiled, creating a strategic topic score. Also, all of the scores can be added together to provide a composite score. Alternatively, if letters are used, the letters are averaged to provide a score or grade for the website. The process/system is customizable such that the scoring or grading scheme can be adjusted or calibrated (either automatically or manually) to better suit the industry or field to which the website pertains (i.e., e-commerce, news, promotional, etc.). In the case of an automatic (computerized) embodiment, a customization program/tool is provided, allowing the user to add, delete, or modify categories, factors, etc., as well as to adjust the scoring weight of the factors considered. The benefit of the numerous scoring compilations is that even if a website is determined to have a high composite score, there can be areas in need of improvement within the website. By reviewing the strategic topic and sub-topic scores, specific areas in need of adjustment can be pinpointed.

A website's overall composite score is comprised of numerous sub-scores and assessments that measure the effectiveness of the website/web asset across a number of broad strategic categories of drivers that generally correlate with increased revenue maximization. Some examples of such scores include, but are not limited to the following:

1. Potential Traffic/New Customer Acquisition—Is the website properly configured to attract new visitors to the website? (If not, many potential consumers will never get there in the first place.) Are search engines (such as Google) featuring the website in top listings so that people searching for the website's topic will click to it before clicking to a competitor? What is the overall traffic level to the website?
2. Homepage/Branding—When visitors arrive at the website, do they quickly understand what the website does and what products and services are offered? (If they don't, you may never even have the opportunity to make a sale.)
3. Products and Merchandising—Does the website clearly explain the products offered? Are the items presented in the best possible light? Are the various benefits of each product or service clearly articulated?
4. Navigation and Customer Experience—Is there a search box so that visitors can type in what they are looking for and easily find it? Is the website easy to navigate? (If not, visitors will drop out quickly and you lose the sale.)
5. Entertainment Value/"Stickiness"—Are there fun and/or useful diversions and/or tools (e.g., games, mortgage calculators, etc.) on the website to keep visitors engaged in the product as long as possible in order to improve the odds of making a sale?
6. Call to Action/Revenue Maximization—Does the website actively push visitors to take action (e.g., "buy now", "visit us now," etc.). When a customer purchases one item, does the website attempt to cross-sell them a second related item? In the case of retail stores, is it easy to find store addresses and hours? (If not, users may get frustrated and not come, thereby losing potential sales and revenues.)
7. Relationship Building/Customer Retention—Does the website capture the customer's e-mail address to maintain an ongoing relationship with them, and send them periodic e-mails so that they come back again and buy again? Does the website encourage them to tell their friends about the website (i.e., via referral promotions, etc.),
8. Customer Care/Trust—Is it easy for them to get help and quick answers to questions? Do you make your privacy policy easily visible? Are there visible menu options on the website's homepage for job seekers, the press and investors? Can potential new customers easily find the company's telephone number and e-mail address?

These categories are examples of factors which are used in evaluating a website. As described, these categories can be modified, added to, or deleted, to better tailor and focus the analysis to the particular website/industry.

The uniqueness of such a scoring scheme is that it measures the FULL RANGE of web health measures to determine if the website is fully capable of revenue maximization. Is the website optimized to generate the most potential revenues for its owner? The higher the composite score, the more likely the website is to meet this objective. If it is not as strong, weak areas with low sub-scores are easily identified, leading to a prescribed course of action for that weakness. Other analytic tools, which explore only one or two health areas (e.g., customer "experience") only, allow the website's owner to capture information on a fraction of what is needed to understand the full picture of all revenue drivers and take corrective action to improve revenue growth In each of the broad strategic categories, there can be numerous detailed sub-topics. Furthermore, the process/system can be customized to add, delete, and/or modify categories and sub-topics, allowing the user to better analyze a particular website. This feature is particularly useful in industries and fields where specific and/or unique features have increased importance. For example:

A. Each of the many sub-topics is rated on a numerical or alphabetical quality scale (e.g., 1-10, A-F, etc.). To determine the overall sub-topic score, a series of specific questions are asked (and quality attributes explored) relating to that topic, and scored accordingly to reach a final score on the quality scale. Some questions are answered through a quantitative, objective measure (e.g., traffic ranking compared to industry norm), others are a clear yes/no answer (e.g., Does the website have a "search" box function on the homepage of the website?), while others still are subjective in nature (e.g., Does the website clearly explain what the company does on the homepage?) and require a human opinion to generate a score. The numerous questions and their answers add up to a maximum point score (i.e., 10 points) for that sub-topic.
B. Each of the sub-topics is then weighted according to their levels of importance/potency in helping websites to maximize revenue generation. For example, in many cases the quality of the product information or the website's ranking on search engines like Google would be more emphasized than high entertainment value. These weightings can be adjusted, either automatically (in the case of an automatic/computerized embodiment) or manually, as well as adjusted for the type of website (i.e., e-commerce, content based, portal, etc.) to reflect other website attributes that would be more potent in driving revenue at that time.

C. Each of the many sub-topics (graded on a scale such as a 1-10 point scale) would then be multiplied, either automatically or manually, by its respective weight index. The weight index is determined using criteria that consider the importance of the given factor within the current website, as well as similar websites within the same industry/field. These weight indices can be manually generated or calibrated by the consultant/user, automatically generated by a software program/system (using preset values, or being generated by previously analyzed website data as stored in the system database), or through any combination thereof. The final score can be presented in a numerical (i.e., 1-100) or alphabetical (i.e., A-F) range, or any other such grading scheme. Accompanying the score, a key is also presented for understanding the scores (i.e., scores above 70 would be considered strong, etc.). In the case of the automatic (computerized) embodiment, this key can be generated automatically using a software program/tool.

D. Each of the many broad strategic revenue driver categories would also receive a score (i.e., 1-10, A-F) range based on the (weighted) sub-topic scores contained within them.

By understanding their overall composite score, a website's owner's can quickly determine how they stack up versus their competitors, industry norms, and best practices.

By understanding which sub-topics and which of the broad strategic revenue driver categories a website excels in, and which it needs to improve (again, relative to competitors, industry norms, and best practices), a company can take focused, corrective actions to improve those specific drivers as needed to increase their website's revenue streams. For example, if a website already sells a lot of products, but the company does not seem to be building long term relationships (i.e., few repeat customers), the website could optimize this area (e.g., ask new customers for an e-mail address and then through that e-mail address, communicate special sales, promotions and useful user tips throughout the year).

Sub-scores allow the website's owner to see the full range of website revenue maximization drivers across the many broad strategic categories, as well as accompanying relevant information (for themselves, competitors, and the industry). To do so, a comprehensive scoring report is generated, which reflects not only the website's own scores, but also the scores of other competitors as well as industry/field averages. This report can be generated manually (requiring human intervention, generally by a consultant), or automatically, utilizing a specialized software program/tool. In the automatic (computerized) embodiment, the report can be generated based on preset information already within the system, as well as information retrieved from the system's website information database of sites which it has already analyzed. This report identifies the strengths, weaknesses and gaps present in the current website. By seeing the FULL RANGE of drivers and issues (through the broad strategic topics, sub-scores, and mini questions within them), website owners can then take focused and specific actions to correct those areas that need improvement.

The process/system can also help the user assess whether the website has the features, characteristics, and capabilities to drive viable e-commerce and money making benefits in a meaningful way, or whether it is just a "pretty" website that provides information and adds no true financial value to the company. The system can also answer how well the website stacks up versus competition and provide early warning signs/indicators as to whether a competitor is offering new web features that create a competitive advantage for them that the owner won't find out about until it is too late.

By looking at high scoring best practice sites (either manually or automatically via the system's analyzed website database), additional revenue maximization recommendations can be made.

After taking action steps learned from the website quality/profitability assessment, companies can repeat the analysis over time intervals (i.e., a half-year or a year later) to see how much the website has improved over time, and how well the website compares with current industry competition.

An important step in the website analysis process is comparing the scores generated for one website with those of competitor or similar website. This comparison helps companies improve their performance by targeting areas where competitors may currently hold an advantage. In comparing the two sites, many factors are considered, such as website objectives, industry, approach, interface, layout, as well as website statistics such as traffic, page views, etc. This process can be accomplished manually, through human intervention (e.g., a consultant comparing the generated scores with the scores of other sites), automatically, through the use of a comparison program/tool, or through any combination thereof. In the case of the automatic/computerized embodiment, the system also maintains a database of all previously analyzed websites. As more and more sites are analyzed by the system, the system become increasingly effective in identifying what does (and does not) comprise a healthy and profitable website. This data can then be harnessed both in terms of improving existing websites, as well as in creating new ones. Furthermore, the data stored in the database can be manipulated and classified by any number of criteria (such as industry, field, etc.) so that the data collected can be appropriately utilized. The system can also be configured to automatically scan sites on the Internet, thereby increasing the database's size and utility.

In addition to creating a score, the method/system also generates recommendations for improving the health, effectiveness, and profitability of the website. The recommendations are generated based on the website's current set of quality/profitability scores, as well as the scores of other sites (either within or outside the website's industry or field) that have been scored to be more effective. These recommendations can be generated manually (i.e., through human intervention, such as a consultant identifying problem areas based on the website's scores, and suggesting changes to be implemented), automatically (i.e., through a software program/system that automatically generates recommendations for improving the website), or through any combination thereof.

Figure 2:
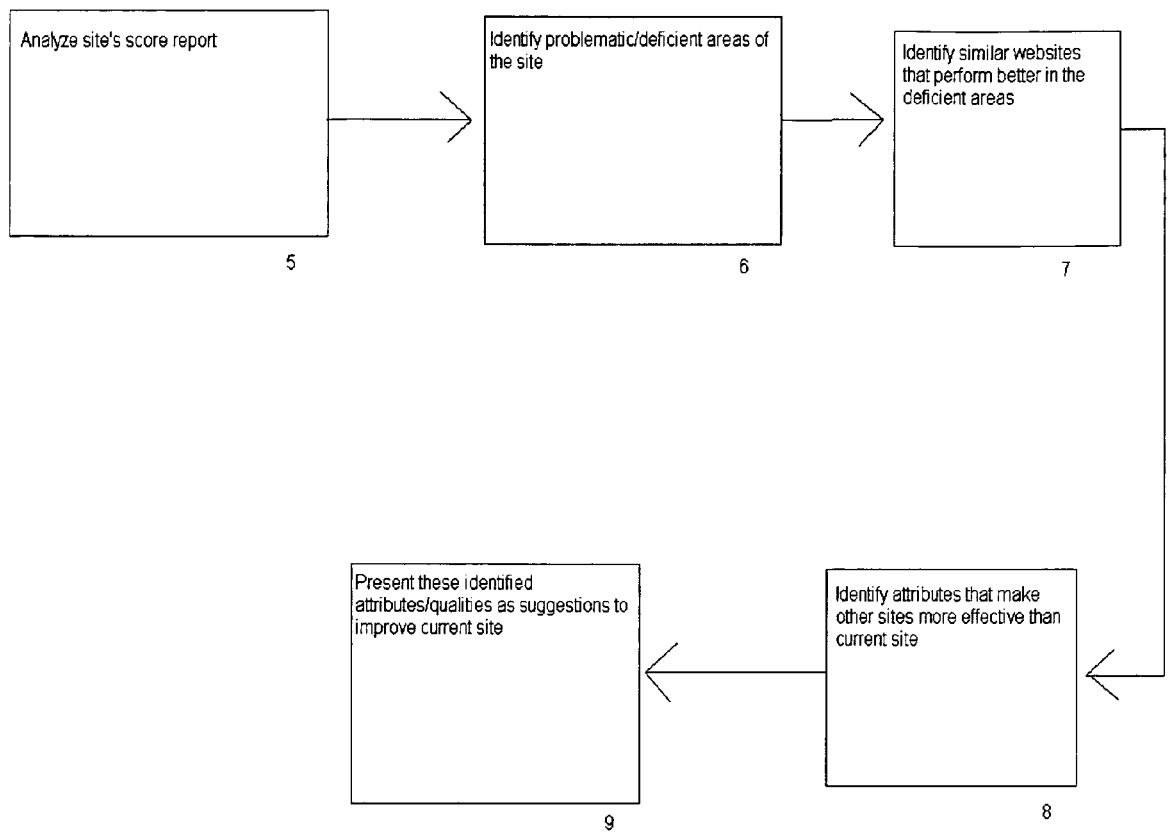
FIG. 2 represents a process flow diagram of the steps a software program takes in generating recommendations.
Figure 3:
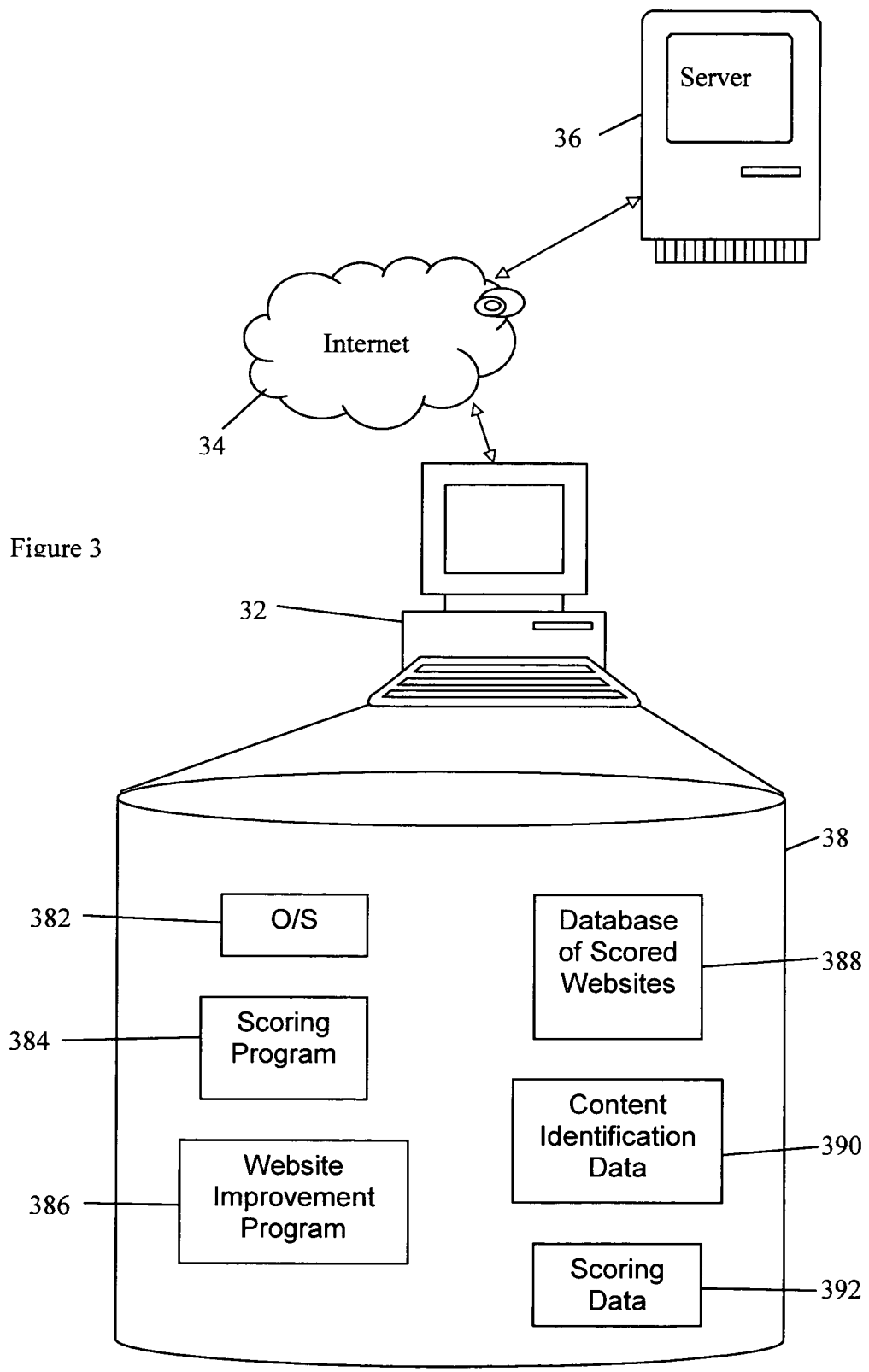
FIG. 3 is a system diagram illustrating a computer system having computer programs which when executed form an automated (computerized) embodiment.

Further details of the automatic (computerized) embodiment are described with respect to FIGS. 2 and 3.

FIG. 3 illustrates a system diagram of the automatic (computerized) embodiment of the present invention. More particularly, a general purpose computer system 32 is provided with a network card, modem, or other interface means to allow the computer system 32 to form logical connections via the Internet 34. In particular, the computer system 32 is arranged to form a logical connection, for example using TCP or UDP running over IP, with a server computer 36, acting as a net server, thereby allowing a client program installed on the computer system 32 to obtain data from the server 36. For example, in the present embodiment the client program is preferably a browser program such as Microsoft® Internet Explorer®, Netscape® Navigator, or the like, and the data downloaded from the server 36 is a webpage to be analyzed.

Within the general purpose computer system 32 according to the present embodiment is a computer readable storage medium 38, such as a hard disk drive. In other embodiments other forms of computer readable medium can be used, such as optical disks, magneto-optical disks, zip drives, etc. Stored on the computer readable medium 38 is a plurality of programs, including a conventional operating system program 382 arranged to allow the computer system to operate. Additionally provided is a scoring program 384 arranged to control the computer system to analyze a website to produce a score for that website in the manner described previously, as well as a website improvement program 386, which receives the (usually HTML or Java) code of a website, and identifies deficient areas of the website. Improvements to the deficient areas are then suggested, in a manner to be described later.

In addition to the above mentioned programs, the computer readable medium 38 also stores several sets of data for use by the computer programs to provide the present embodiment. Firstly, a set of content identification data 390 is provided, which is used by the scoring program 384 to allow content of a website to be identified and a score allocated thereto. The content identification data therefore preferably contains a plurality of content templates, indicative of content types which can be found on web pages. For example, one such template can be the web code for a "search" box provided on a web site. Another such template can be the web code for a banner, while another such template can be the web code for an input box, for example to capture an email address. Content type templates are preferably provided for all or the most common of the different types of content that can be encountered on a website.

Additionally provided is scoring data 392, which is produced by the scoring program 384 after analyzing a website. More particularly, the scoring data is data which represents a parse (decomposition) of the website into its component content, identified using the content identification data 390, and applies the analysis criteria and scoring methods discussed previously to arrive at a score for each content element. The individual scores can then be combined as described previously to produce a total score for the website. The individual scores and the overall score are stored in the scoring data 392.

Also provided is a database of scored websites 388, including websites which have being subject to analysis either by the scoring program, or manually, previously. The database can conveniently comprise a collection of scoring data in the same form as scoring data 392, with a set of scoring data for each analyzed website. This has advantages in that it allows for straightforward comparison of the scoring data of the presently analyzed website with the database of previously scored websites to identify where the present website can be improved. The database 388 also preferably stores the individual scoring records in a structured form, such as indexed for example by industry, name, business field, or the like. Such a structured storing of the scoring data from previous websites allows only a subset, for example websites in the same field (e.g. banking, retail, or the like), to be used for later comparison against the present website.

The automated (computerized) embodiment has two modes of operation, which can be used separately, or together. In a first mode of operation the computer system 32 runs the scoring program 384, to automatically analyze a website to produce a score therefor, addressing the issues described previously. More particularly, in the first mode of operation the scoring program controls the computer 32 to connect, via the Internet 34, to the server 36 to download a website to be analyzed. Once the website has been downloaded its contents are stored, and then subject to analysis using the content identification data to identify content types and specific instances thereof, thereby obtaining a parse of the website into its component parts which can then be subject to the scoring criteria noted earlier. For example, the web code for the website is analyzed against the content templates of the content identification data 390 to identify specific content e.g. a search box, input box, textual description, images, etc. and record the identified attributes e.g. size, and location on the page. By comparing the web code against all of the different content templates to identify content, and then recording the individually identified content attributes, information on the composition of the page is obtained, to feed into the scoring process.

Having parsed the page into its component parts i.e. identified the content on the page, and determined the attributes for the individual content items, the content and other website properties can be scored using the criteria described previously. By the very nature of the automated (computerized) embodiment a subset of the scoring categories mentioned earlier and which are susceptible to automatic analysis can be employed, but in an alternative hybrid embodiment using both automatic and manual analysis the full range of categories can be used. For example, in such a hybrid embodiment the scoring program can automatically score those elements that are capable of objective analysis, such as website traffic, download times, etc as well as some subjective elements such as some content attributes (size and location on the page). To score other subjective elements, however, such as aesthetic design of a website logo, for example, a user is prompted to review the element and to allocate a score to the element.

For the automatic (computerized) embodiment, however, it is envisaged that both objective (e.g., site traffic data, size of the site, etc.) and subjective (e.g., stylistic and design factors) criteria where possible are analyzed, for example using at least some of the following categories.

1. Potential Traffic/New Customer Acquisition—The scoring program can be arranged to access a search engine such as Google to perform an automated search using a predetermined keyword to see where the website appears in the listing. A score can then be allocated based on the listing, as described previously. Moreover, traffic records can also be accessed, and predetermined thresholds applied to the traffic numbers to determine a score for the traffic element.

2. Navigation and Customer Experience—The scoring program is further arranged to determine if one of the identified content items is an input box for a site search engine. A score can be allocated to this element based on a priori settings as to attributes such as location and size of the box, if it exists. For example, a higher score may be awarded if the search box is above a certain size, and/or located at a particular location on the page. In the same category, a score can also be awarded if a content item has been identified as a site map. Again, the location, size, and other attributes, of the map can attract points, in accordance with a priori settings in the scoring program 384.

3. Entertainment Value/"Stickiness"—Points can also be awarded if content items which have active processing elements (such as Java applets) such that they are likely to represent entertaining content such as games, calculators or the like are identified. Again, differing points can be awarded depending on the attributes of the content in accordance with predetermined attribute thresholds for point scoring 4. Relationship Building/Customer Retention—If content is identified on the website that captures the customer's e-mail address to maintain an ongoing relationship with them, then points can be awarded. This can be identified by the existence if input boxes on the page, perhaps with captions identifying that the box is for an email address. Again, the attributes of the identified relevant content determine the points scored in accordance with predetermined scoring criteria.

5. Customer Care/Trust—Content items identified as "Help" links, privacy policies, contact data, or the like may all be subject to automatic identification using appropriate identification data 390, and used as scoring criteria, based on their identified attributes.

Other categories subject to automatic analysis may also be included, where appropriate.

As noted previously, once the scores have been generated they can be weighted appropriately, and a final score for the website can be obtained. Of course, the individual sub-scores for each measured category can also be made available, as previously discussed. Once a score (and sub-scores) have been produced, the first mode of operation of the automatic (computerized) embodiment ends. All of the generated scores, and sub-scores for individual content items, are stored as the scoring data 392. The scoring data 392 is also preferably added into the database of scored websites 388.

The second mode of operation of the automatic (computerized) embodiment then involves generating recommendations for improving the website. FIG. 2 represents a process flow diagram of the steps such a software program takes in generating these recommendations. It should be noted that the second mode of operation can be used either together with the first mode of operation, it which case follows the first mode of operation, or can be used independently from the first mode of operation, for example where the scoring data 392 for the website to be improved has been generated manually, or in a hybrid manual/automatic embodiment.

Referring to FIG. 2, first, the website improvement program when run on the computer 32 analyzes the score data 392 (generated either automatically or manually) of the given website, which contains the scoring of all analyzed elements of the website (5). As described above, this set of scores can be generated automatically, using the scoring program 384 for website scoring, manually, using a software program which prompts the user to input a score for various criteria, or through any combination thereof. In the case of the automatic scoring software program 384, as described above the program identifies and evaluates the content and data associated with the site, and allocates scores to the identified content. The scoring data 392 thus obtained can then be used by the website improvement program to identify problematic or deficient areas of the website (i.e., scores below a certain minimum threshold) (6). Next, the web site identification program identifies similar websites which perform better in the deficient areas (7). This can be accomplished, either automatically, using a search tool, through retrieval from the pre-existing database of scored websites 388, or manually by the user. Once these (more effective) sites are identified, the program pinpoints the qualities and attributes of the content thereof that make them superior or more effective than the current website (8). This is accomplished by comparing the deficient content identified in step (6) with the more effective content identified in step (8). To do so, the website improvement program analyzes the attributes of deficient content (from the website to be improved) and the attributes of superior content (from the comparison website/s), and identifies the qualities and/or aspects of the attributes that make the comparison website superior. This comparison is particularly facilitated by the individual scoring data 392 for each website stored in the database 388 being in substantially the same format, and by the storing of attributes of content against the scores, as then both straightforward comparison of prior website scores can be made against the scores of the website being improved, and also the attributes which led to the higher scores being identifiable.

Having identified the desirable attributes of content of the prior superior websites, the website improvement software program then converts these identified attributes into tangible modifications that can be made to the existing website (e.g., add search box, move menu bar, etc.), and these modifications are passed through a dynamic webpage generation program which generates the appropriate HTML or webpage coding associated with such changes. These attributes and/or qualities are then presented to the user (9) as suggestions for improving the quality of the current website.

Finally, the website can be modified to incorporate the recommendations as generated by the process/system. These recommendations can be implemented manually by the user, using web development tools and programs such as Microsoft FrontPage. Alternatively, in the automatic (computerized) embodiment, the user can use an integrated web design tool to seamlessly implement the generated recommendations. This web design tool is an integrated web development environment that is also able to dynamically generate the appropriate coding necessary to implement the changes and improvements proposed by the analytic system. Thus, many users can not only identify the areas of their sites that need improvement, they can also actively implement these changes with little or no web development experience. After such modifications (either automatic or manual) are in place, the website can then be reanalyzed to determine the effectiveness of the changes made.

The invention is further described in detail by reference to the following experimental examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

EXAMPLES

Example 1

"Sub-Topics" (Preceded by Eight Respective Strategic Revenue Driver Categories)

A. Potential Traffic/New Customer Acquisition
    1. Search Engine Optimization/Penetration
    2. Search Engine Marketing/Paid Search
    3. Popularity Contest (how many other web sites link into yours)
    4. Traffic Ranking across all websites
  B. Homepage and Branding
    5. HomePage Quality (first/welcome page of the website)
    6. Branding clarity
    7. Homepage Loading Speed C. Products and Merchandising
   8. Product Information Clarity
   9. Quality of Product Merchandising
D. Navigation/Customer Experience
   10. Internal Search Capabilities
   11. Navigational Ease thru the website
E. Entertainment Value/"Stickiness"
   12. Entertainment Value
F. Call to Action/Revenue Maximization
   13. Call to Action
   14. "Want to do Business With You"/Ease of Execution
   15. Cross Sell/Revenue Maximization.
G. Relationship Building/Customer Retention
   16. Relationship Creation
   17. Word of Mouth/Viral
   18. Blogging
H. Customer Care/Trust
   19. Customer Service
   20. External Relations
   21. Legal and Ethical Compliance Example 2

Samples of Sub-Topics and Their 10 Point Scoring Makeup/Tallies

Search Engine Penetration/Optimization (Total of 10 points possible)
1. If you enter the company's name on Google, is it the #1 listing on the results page? (If Yes, score 3 points. If #2, then 1 point. If below that, no points)
2. Enter 3 or 4 of the most relevant keywords on Google that describe product or company highlighted on the website. What is the highest ranking of the website within these results? ((If #1, score 5 points. If #2, score 4 points. If #3, 3 pts. If #4, 2 pts. If #5, 1 pt. If below this, no points.)
3. Is the web's homepage "keyword rich" (i.e. full of the critical words, in the right technical format, so search engines can find you?). (If solidly yes, score 2 points. If somewhat, score 1 point. If weak, score no points)

Overall Traffic Ranking Across all Sites (Total of 10 Points Possible)

Measured automatically through a query to a website that contains this data and measures the traffic of all websites. Take the average of the past three months. (If it is one of the top 100 most visited websites in the U.S., score the full 10 points. If ranked 100-500, score 9 pts. If 501-1000, 8 pts. If 1001-5000, score 7 points. If 5001 to 10,000, 6 pts. 10k-20 k, 5 pts. 20 k-35 k, 4 pts. 35 k-50 k, 3 pts. 50 k-100 k, 2 pts. 100 k-500 k, 1 pt. Below the 500 k most visited rank, no points scored.)

Internal Search Capabilities (10 Points Possible)
1. Is there an internal search box on the homepage so that visitors can easily search for specific products/topics within the website? (If yes, score 3 points. If no, score no points).
2. Quality of the search box (Score on 2 point quality scale). Score based on the presence of these factors: Is the box labeled by a standard term (i.e., "search") vs. something else which is confusing? Large box vs. small? Box or some other shape? White? Top of page and easy to find? Is it on other pages as well?
3. Does search function work well (3 point quality scale)?
4. Is there a "site map" available on the homepage? (If yes, 2 points. None, no points.)

Relationship Creation (10 Points Possible)
1. Does the site ask the consumer to "register" and provide an e-mail address so that the company can develop a long-term relationship with them? (Yes—score 5 points. No—score no points)
2. Does the site provide compelling reasons and benefits of registering (i.e., "If you register, you get x, y, and z"). (3 point scale depending on quality of benefit articulation.)
3. Registration request—large lettering on homepage? (Yes—1 point; If small and not noticeable—no points.)
4. Is the registration request on other pages as well? (If yes, 1 point. If no, zero points)

Example 3

Examples of Components for the Scoring System

Potential Traffic & New Customer Acquisition
1. SEO/Search Engine Penetration
A. Brand name ranking on Google
B. Relevant keyword descriptor ranking on Google free search
C. Keyword "richness" of homepage
2. Search Engine Marketing/Paid Search
A. Total search penetration
B. Highest paid ranking on Google
C. Google message . . . how compelling
D. Landing Page from Google
3. Popularity Contest
A. Google Page Rank
B. Inbound Links to the site.
4. Traffic Rank for past three months
Homepage and Branding
5. Homepage/First Impression
A. Simplicity
B. Clarity of Business Premise/tagline
C. Tasks—Can people quickly figure out what button to hit?
6. Branding
A. Brand name on homepage
B. Size of logo
C. Logo on each page
D. Essence of brand
7. Homepage loading speed
Products & Merchandising
8. Product Information
A. Clear overview of products in one place?
B. Basic product details clarity
C. In depth product information
9. Product merchandising
A. Product features
B. Product "celebration" (end benefits, endorsements etc.)
C. Enhancement Tools (e.g. zoom/enlarge)
Navigation & Customer Experience
10. Internal Search
A. Search box on homepage
B. Features of box
C. How well does it work
D. Site map availability
11. Navigational Ease
A. Usability
B. Number of steps needed to complete transaction
C. Are steps to completion shown?
D. Homepage quick links or drop down menus Entertainment Value & Stickiness
12. Entertainment Value/Stickiness
A. Overall creativity/uniqueness
Online surveys
C. Entertainment Value (games, sweepstakes, white papers, tools etc.)
Call to Action/Revenue Maximization
13. Call to Action
A. Shipping discounts
B. Highlighting of sale items
C. Call to Action Features (e.g. coupons, rebates, try it for free, money back guarantee)
14. Ease of Execution
A. Store locator
B. Maps
C. Store Hours
15. Cross Sell/Revenue Maximization
A. Suggestion of other related cross sell items
B. Upsell other categories
C. Cross channel selling
D. Alternative use
Relationship Building & Customer Retention
16. Relationship Creation
A. Request for e-mail address on homepage
B. Articulation of tangible reasons/benefits of registering
C. Request prominent
D. Request on subsequent pages
17. Word of Mouth
A. Tell a Friend request on homepage
B. Request on subsequent pages
C. Creative feature worth sharing
18. Blogs
A. Blog sentiment
Customer Care and Trust
19. Customer Service
A. Customer Service link
B. Real Time help
C. Help telephone number
D. E-mail address availability
E. FAQ section
20. External Relations
A. About Us
B. Corp mailing address and telephone number
C. Press/Investor Info/Employment opportunities
D. Press Releases
21. Legal and Ethical Compliance
A. Privacy Policy
B. Link to privacy policy
C. Ease of comprehension
D. Easy way to "opt out" of e-mail lists The invention has been described in an illustrative manner, and it is to be understood that the terminology used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A computer implemented content and data analysis method for evaluating a website's overall quality, measuring the website's ability to generate revenue by ranking objective criteria comprising potential traffic and new client acquisition, home page branding, products and merchandise based on product information clarity and quality of product merchandising, navigation and customer experience based on internal search capabilities and navigational ease through website, entertainment value, call to action, relationship building and customer retention, and customer care and trust, and improving a website comprising:
   accessing the website to be analyzed;
   analyzing the content and data associated with the website based on revenue generating factors quantifying the site's revenue-generating capacity by ranking objective criteria comprising: potential traffic and new client acquisition, home page branding, products and merchandise based on product information clarity and quality of product merchandising, navigation and customer experience based on internal search capabilities and navigational ease through website, entertainment value, call to action, relationship building and customer retention, and customer care and trust;
   scoring the website based on the ranked objective criteria by combining the generated scores to create a composite score for the website;
   generating suggestions for improving the website based upon the scoring by comparing the scores of the website with predetermined scores of other websites, and identifying weaknesses and deficiencies present in the website; and
   automatically generating the appropriate HTML or webpage coding from a dynamic webpage generation program based upon the suggestion generated.

2. The computer implemented analysis method of claim 1, wherein said accessing includes viewing the website through a web browser or any other such computer program for viewing websites.

3. The computer implemented analysis method of claim 1, wherein said analyzing includes as reviewing the attributes and data associated with the website.

4. The computer implemented analysis method of claim 1, wherein said scoring includes attributing and recording a series of scores based upon a series of factors and criteria.

5. The computer implemented analysis method of claim 4, wherein said scoring further includes weighing and adjusting scores to better tailor the scoring scheme to the website.

6. The computer implemented analysis method of claim 1, wherein said generating further includes identifying strengths and/or advantages present in other websites.

7. The computer implemented analysis method of claim 1, wherein said generating further includes presenting suggestions to improve the content, presentation, and data of the website.

8. The computer implemented analysis method of claim 1, wherein said automatically generating the appropriate HTML or webpage coding form a dynamic webpage generation program includes editing or modifying the website to reflect improvements and changes.

9. The computer implemented analysis method of claim 1, wherein said analyzing includes analyzing the content and data associated with the ability of the website to generate revenue.

10. An electronic content and data analysis system recorded upon a non-transitory computer readable medium comprising instructions for:
   an accessing mechanism for viewing a website to be analyzed;
   an analyzing mechanism for reviewing the content and data associated with the website based on revenue generating factors quantifying the site's revenue-generating capacity by ranking objective criteria comprising potential traffic and new client acquisition, home page branding, products and merchandise based on product information clarity and quality of product merchandising, navigation and customer experience based on internal search capabilities and navigational ease through website, entertainment value, call to action, relationship building and customer retention, and customer care and trust;

a quantifying mechanism for attributing scores to the website based on the ranked objective criteria bay combining the generated scores to create a composite score for the website;

a generation mechanism for providing suggestions for improving the website based upon the scoring by comparing the scores of the website with predetermined scores of other websites, and identifying weakness and deficiencies present in the website and automatically generating the appropriate HTML or webpage coding from a dynamic webpage generation program based upon the suggestions generated.

11. The system of claim 10, wherein said accessing mechanism is a software program for viewing websites.

12. The system of claim 10, wherein said analyzing mechanism is a software program for reviewing the attributes and data pertaining to the website.

13. The system of claim 12, wherein said analyzing mechanism is a database for storing attributes and data pertaining to the website.

14. The system of claim 10, wherein said scoring mechanism is a software program for attributing scores to a multitude of criteria associated with the website.

15. The system of claim 14, wherein said scoring mechanism is a software program for weighing generated scores for tailoring the scoring scheme to the website.

16. The system of claim 14, wherein said scoring mechanism is a database for storing all generated information for reference and future analysis.

17. The system of claim 10, wherein said generation mechanism is a software program for providing suggestions to improve the website.

18. The system of claim 17, wherein said generation mechanism is a software program for comparing the scores generated for the website with those of other websites.

19. The system of claim 17, wherein said generation mechanism is a software program for identifying the weaknesses and deficiencies of the website, as well as the strengths present in other websites.

20. The system of claim 17, wherein said generation mechanism is a software program for presenting recommendations for improving the website, based on the system's analytic process.

21. The system of claim 10, wherein said generation mechanism further includes an editing mechanism of is a software program for implementing changes and suggestions within the website.

* * * * *